United States Patent

[11] 3,614,623

[72] Inventor Gerald K. McAuliffe
Mahopac, N.Y.

[21] Appl. No. 817,887
[22] Filed Apr. 21, 1969
[45] Patented Oct. 19, 1971
[73] Assignee North American Rockwell Corporation

[54] ADAPTIVE SYSTEM FOR CORRECTION OF DISTORTION OF SIGNALS IN TRANSMISSION OF DIGITAL DATA
12 Claims, 20 Drawing Figs.

[52] U.S. Cl. .......... 325/42, 325/65
[51] Int. Cl. .......... H04b 1/10
[50] Field of Search .......... 325/42, 65, 333; 178/69; 179/15 AD

[56] References Cited

UNITED STATES PATENTS

| | | | |
|---|---|---|---|
| 3,524,169 | 8/1970 | McAuliffe et al. .......... | 340/172.5 |
| 3,404,338 | 10/1968 | Cannon .......... | 325/65 |
| 3,366,895 | 1/1968 | Lucky .......... | 325/65 |

*Primary Examiner*—Robert L. Griffin
*Assistant Examiner*—Anthony H. Handal
*Attorney*—L. Lee Humphries

ABSTRACT: An adaptive-type system which provides improved arrangements for correction of distortion of digital data sent over a transmission channel. The system includes a data shift register which stores received data bits and cross-correlates these with the signal being received to thereby obtain the impulse response of the transmission channel to provide compensation therefor. Cross-correlation networks produce a correction signal for compensation by digitally multiplying each of the *n* most recently received data bits by any residual distortion remaining in a sampling of the received signal after compensation and integrating the respective products. Residual distortion is detected by comparison of the sampling of the received signal after compensation and the signal for the most recent data bit to provide a residual signal. This residual signal is applied to the correlation circuits to produce a final correction signal which eliminates any distortion causing errors in transmission of the digital data. Another embodiment of the invention also compensates for cross-channel distortion arising in a quadrature modulation system.

INVENTOR.
GERALD K. McAULIFFE
BY
ATTORNEY

INVENTOR.
GERALD K. McAULIFFE
BY [signature]
ATTORNEY

INVENTOR.
GERALD K. McAULIFFE
BY
ATTORNEY

INVENTOR.
GERALD K. McAULIFFE

BY [signature]

ATTORNEY

INVENTOR.
GERALD K. McAULIFFE
BY
ATTORNEY

INVENTOR.
GERALD K. McAULIFFE
BY
ATTORNEY

INVENTOR.
GERALD K. McAULIFFE

BY [signature]

ATTORNEY

ADAPTIVE SYSTEM FOR CORRECTION OF DISTORTION OF SIGNALS IN TRANSMISSION OF DIGITAL DATA

BACKGROUND OF THE INVENTION

1. Field of the Invention

This invention relates to an improved system for correcting distortion of digital data sent over a transmission channel. More particularly, the invention relates to a digital, impulse response correction system which adaptively determines the impulse response of the transmission channel by detection of any residual distortion in the compensated data signals and derives therefrom a new correction signal which, when combined with the signal being received, permits earlier recovery of the transmitted data in essentially undistorted form. 2. Description of the Prior Art Over the years, vast sums of money have been expended in providing telephone transmission equipment designed primarily for voice communication. With the advent of increased demand for transmission of digital data, it has been necessary to develop systems which enable data to be sent over these existing voice transmission lines. To accomplish this, the systems had to overcome a number of problems, the most significant of which is that typical telephone transmission channels exhibit considerable delay distortion. That is, signal components at certain frequencies within the audio passband experience a longer transmission time delay than do components at other frequencies. Although this delay distortion does not significantly impair the intelligibility of voice signals transmitted over the line, it does cause severe distortion of digital signals transmitted on the line.

In the past, a number of techniques have been used to correct for this transmission path distortion of digital data. For example, if the characteristics of the transmission line are known, it is possible to accomplish equalization by predistortion. That is, the signal to be transmitted itself is distorted in a way such that the additional line distortion alters the predistorted signal to produce a received signal having a desired waveshape. Clearly, use of this technique is limited to those situations where the delay characteristics of the line are constant and known.

In the typical situation, the impulse response characteristics of the transmission line in use will not be known and, moreover, may change with time. Prior art transmission systems designed to compensate for such unknown characteristics include the use of equalization networks at the receiving end. These networks function to insert additional delay into the transmission path at those frequencies which experience minimum delay over the transmission line itself. That is, the signal components which are received first are delayed by the equalization network for a time corresponding to the delay time of the remainder of the frequencies transmitted by the line. Such equalization systems, while widely used, suffer the considerable disadvantage that they must be adjusted each time a change in line delay characteristics occurs. The adjustments are tedious, time consuming, and normally must be performed manually.

Another technique to correct for delay distortion on a transmission line involves the use of transversal filters. A transversal filter comprises a tapped delay line and a plurality of multipliers, each associated with a single tap of the delay line. The multipliers adjust the amplitude and polarity of the signal obtained from the delay line at the corresponding tap. The outputs of these multipliers then are summed to provide the transversal filter output. By appropriate selection of the tap intervals and the multiplication factors associated with each of the taps, the filter may be used to accomplish intersymbol cancellation. That is, by selecting the amplitude characteristics of the multipliers to correspond to the impulse response characteristics of the transmission line, the filter effectively will eliminate the ring-out associated with a digital pulse transmitted over the line. Optimally, however, the transversal filter should be adjusted to correspond to the impulse response of the line, and this too requires either tedious manual adjustment or complicated circuitry. While a compromise adjustment can be made which will minimize the total distortion interference for lines having a range of impulse response characteristics, this is generally not as satisfactory as adjustment to compensate for the particular line.

Again, transversal filters are limited in that, unless adjusted to match the particular line, they do not completely compensate for the distortion of the signal. Generally, such filters are not adaptive to changes in characteristics of the line. Further, such transversal filters suffer the considerable disadvantage that they are not a digital device but rather require the use of an analog delay line. While attempts have been made to digitize such transversal filters, this requires the use of complex pulse code modulation techniques and considerable circuitry. Moreover, the delay of the transversal filter optimally must be considerably longer than the ring-out of the impulse response. Further, the filter may decrease the signal to noise ratio of the system, due to addition of the noise components at each of the taps.

Commonly assigned U.S. Pat. No. 3,524,169, "Impulse Response Correction System," by Gerald K. McAuliffe et al. provides substantial improvements in prior art systems for correcting for the distortion of digital data sent over a transmission channel. As in the present application, the impulse response correction system of the prior copending application adaptively determines the impulse response of the channel and derives from the measured impulse response characteristics, a feedback or correction signal. This correction signal, when combined with the signal received from the channel, allows recovery of the digital signal in essentially undistorted form. Also, as in the prior copending application, the present system uses digital components exclusively and hence lends itself to microminiature implementation; no delay lines are employed.

The present system is also adaptive in that it continuously learns and compensates for variations in the impulse response of the transmission channel. Further, the present system requires no manual setup or adjustment and hence can be operated essentially unattended and may be employed with quadrature and multilevel modulation systems which facilitate the transmission of more than one data bit at a time. Cross-channel distortion which may be present in such a system also is corrected adaptively. When employed, the present system allows transmission of digital data over a voice transmission line at rates either above or below the Nyquist rate for that line.

The system of the present invention distinguishes from the prior art, including said prior copending application, in decreasing the time required to eliminate distortion in transmission of digital data by providing a final correction signal in substantially less time than required in prior adaptive systems, e.g., as disclosed in said prior copending application, whereby the present system has universal application to transmission channels including systems providing for sequential interrogation of many locations via different transmission channels wherein the time interval for transmission of data is less than the time formerly required to derive the final correction signal required for accuracy in the transmission of data. Also, the system of the present invention provides for less dispersion in final data signal levels due to particular data sequences because a residual signal rather than the received signal is applied to the correlation networks.

SUMMARY OF THE INVENTION

The improved correction system of the present invention determines the impulse response of the transmission channel during use by cross-correlating the residual signal, representing the remaining distortion in the corrected signal, with the data being transmitted. If the transmitted data is sufficiently random, a condition which may be insured by the use of appropriate randomizing equipment, the cross-correlation provides a measure of the impulse response characteristics of the channel. The measured impulse response as derived through correlation, and supplemented by residual distortion detection for faster response, is then used to derive the final correction signal in a significantly shorter time period which, when combined with the received signal, allows recovery of the transmitted data in essentially undistorted form. During the learning period at the beginning of transmission, decisions as to the data being transmitted need only be accurate on an average of 50 percent to produce the desired response in producing a correction signal.

To perform the cross-correlation, the received signal, which has been sampled in amplitude at the data transmission rate and compensated by the correction signal, is reduced in amplitude by a signal from the respective correlation network for the current data bit to provide the residual signal. The most recently received data bits, including the current data bit, are stored in cells of a digital shift register. The amplitude of the residual signal at the preceding sample data time is then digitally multiplied by the stored data; that is, the residual signal is either inverted or not inverted depending on whether the current data bit is a binary one or zero. The resultant product is integrated over time (not merely averaged) to provide an output corresponding to the amplitude and sign of the signal for current data bit. The amplitudes and signs of the tail (or ring-out) of the impulse response of prior data bits are also obtained at the data sample times in a similar manner. By multiplying these values by the corresponding data bits stored in the shift register, individual signals of proper polarity are obtained. The correction signal is derived from the impulse response signals for prior data bits by summing of these signals for the tail (or ring-out). The correction signal is subtracted from the sampled received signal to recover the transmitted data. The residual distortion remaining in the corrected received signal, due to correlation network delay in response, is detected by subtracting the signal for the current data bit from the corrected received signal. The residual signal is then used in correlation to derive the amplitude of the current data bit and impulse response values of prior data bits at a faster rate.

Appropriate randomization of the transmitted data may be accomplished by modulo-2 addition of the data with the output of a pseudorandom sequence generator. Alternatively, linear sequential coding networks may be used in the transmitter and receiver.

Thus, an object of the present invention is to provide an improved system for determining adaptively the impulse response of a transmission channel.

It is another object of the invention to provide a system for correcting for distortion of digital data transmitted over a transmission path.

Another object of the invention is to provide an adaptive system for faster learning of the impulse response of a transmission channel and for providing a distortion correction signal derived from the measured impulse response and residual distortion remaining in the corrected data signal being received.

A further object of the invention is to provide a system for faster learning by determination of the impulse response of a transmission path using only digital components.

Yet, another object of the invention is to provide an impulse response correction system using digital components to cross-correlate the transmitted data with any residual distortion remaining in the corrected received signal, thereby deriving the impulse response of a transmission path.

Still another object of the invention is to provide a system for transmitting digital data over a voice transmission path at a rate greater than the Nyquist rate.

A still further object of the invention is to provide a digital impulse response correction system having residual distortion detection for use in conjunction with a multilevel modulation system to compensate for distortion due to the impulse response of the transmission path and to the cross-channel distortion resultant within the modulation system itself.

These and other objects and features of the invention will become apparent in conjunction with the following description and drawings.

Figure 1:
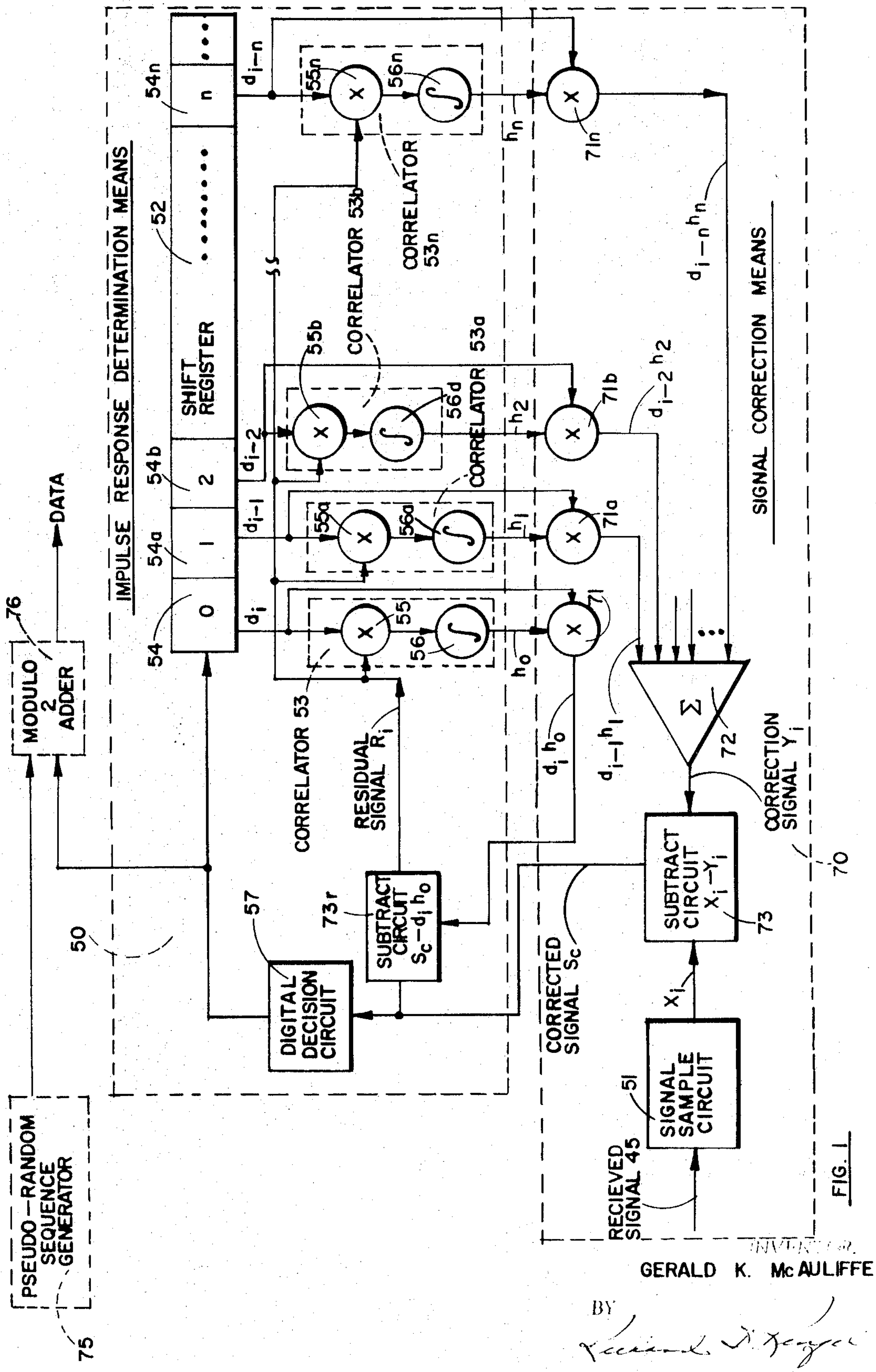
FIG. 1 is a block diagram of a preferred embodiment of the signal correction system of the present invention.
Figure 2:
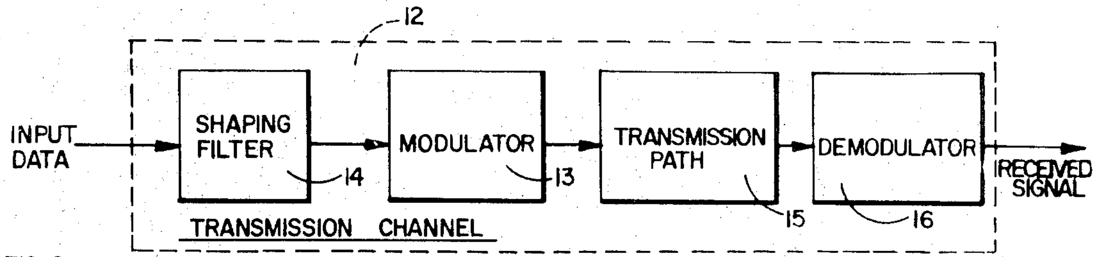
FIG. 2 is a simplified block diagram of a typical data transmission channel for use with the system of FIG. 1.
Figures 4A, 4B, 4C, 4D, 4E, 4F:
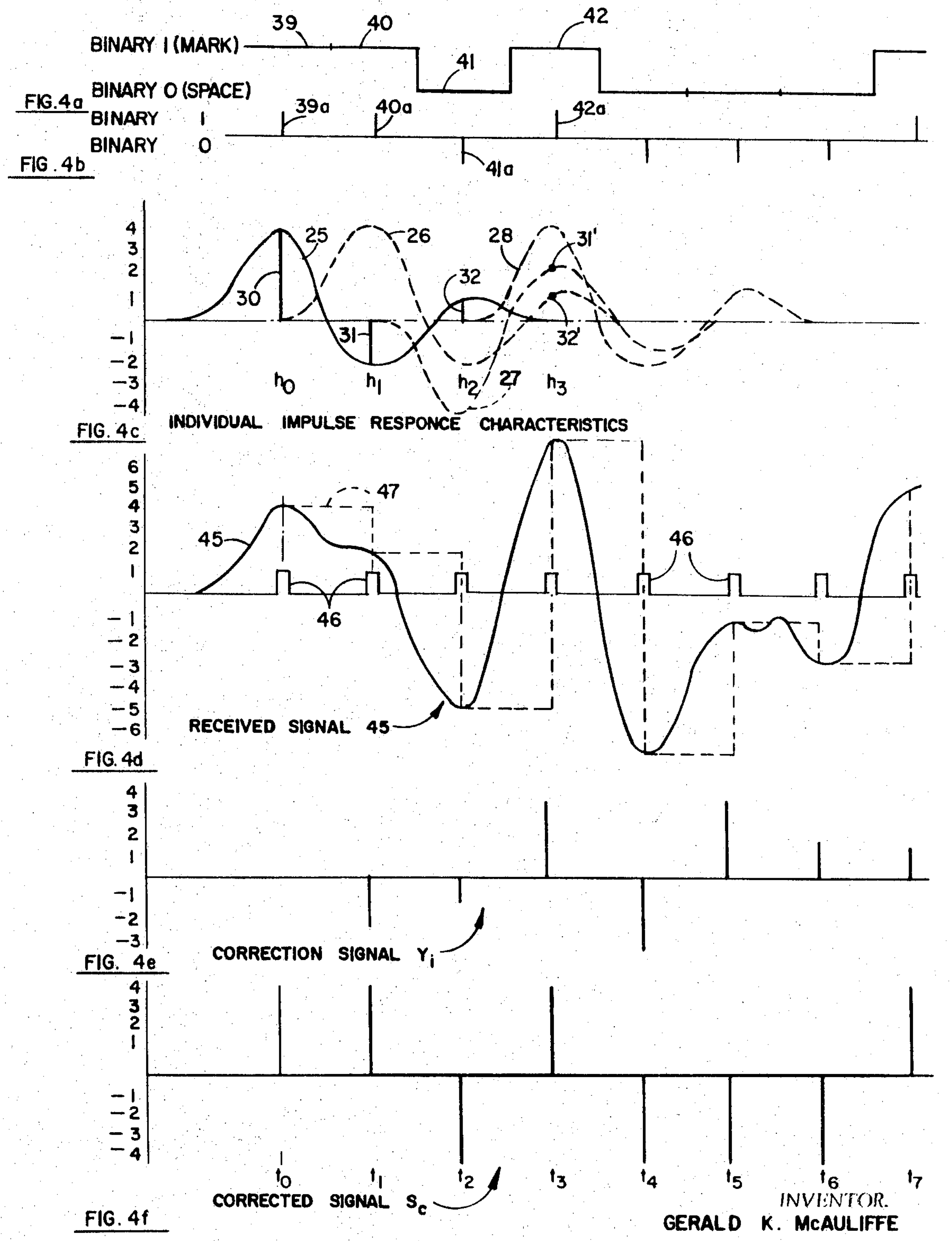

The graphs of FIGS. 4*a* to 4*f* illustrate several waveforms associated with digital data transmission over a transmission channel such as that illustrated in FIG. 2 and with the operation of the signal correction system shown in FIG. 1. In particular:

FIGS. 4*a* and 4*b* illustrate typical binary data sequences, in nonreturn-to-zero and pulse form respectively, which may be sent via a transmission channel.

FIG. 4*c* illustrates typical impulse response of a transmission channel such as that shown in FIG. 2.

FIG. 4*d* illustrates the appearance of a signal containing the data sequence of FIGS. 4*a* or 4*b* as received from a transmission channel having an impulse response similar to that graphed in FIG. 4*c*.

FIG. 4*e* represents a final correction signal generated by the inventive impulse response correction system of FIG. 1 when receiving the signal shown in FIG. 4*d*.

FIG. 4*f* shows the data signal obtained when the final correction signal of FIG. 4*e* is combined with the received signal of FIG. 4*d*.

Figure 5:
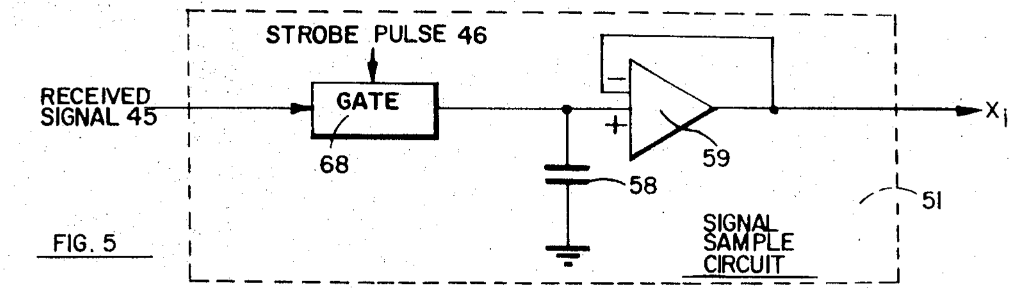

FIG. 5 is a simplified schematic diagram of a signal sample circuit useful in the signal correction system of FIG. 1.

Figure 6:
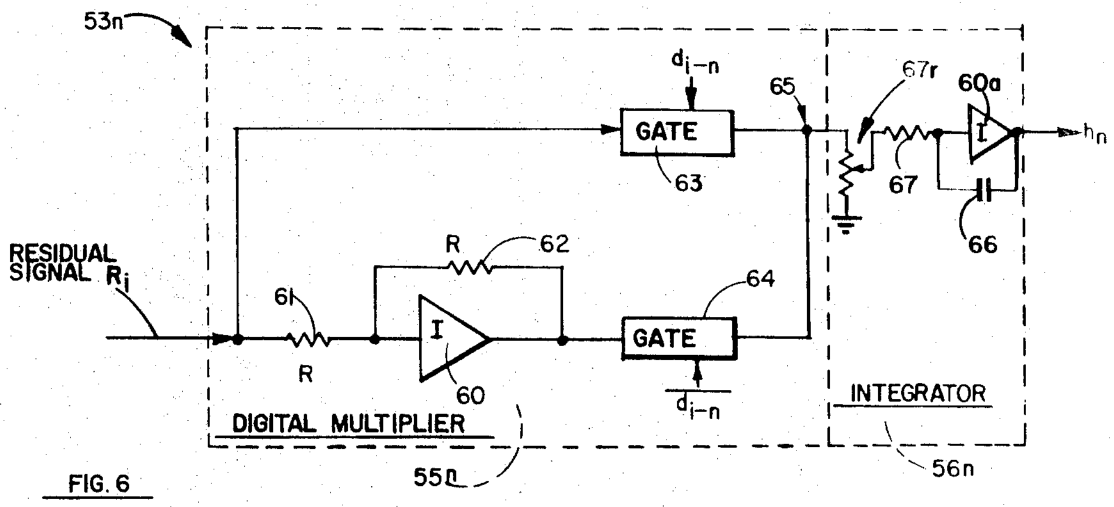

FIG. 6 is a simplified schematic diagram of a digital multiplier and an integrator useful in the signal correction system of FIG. 1.

Figure 6A:
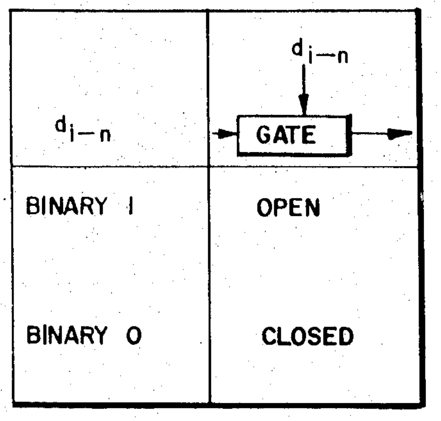

FIG. 6*a* is a truth table associated with a gating of signals in accordance with data bits "1" or "0" in digital multiplier shown in FIG. 6.

Figures 7, 7A:
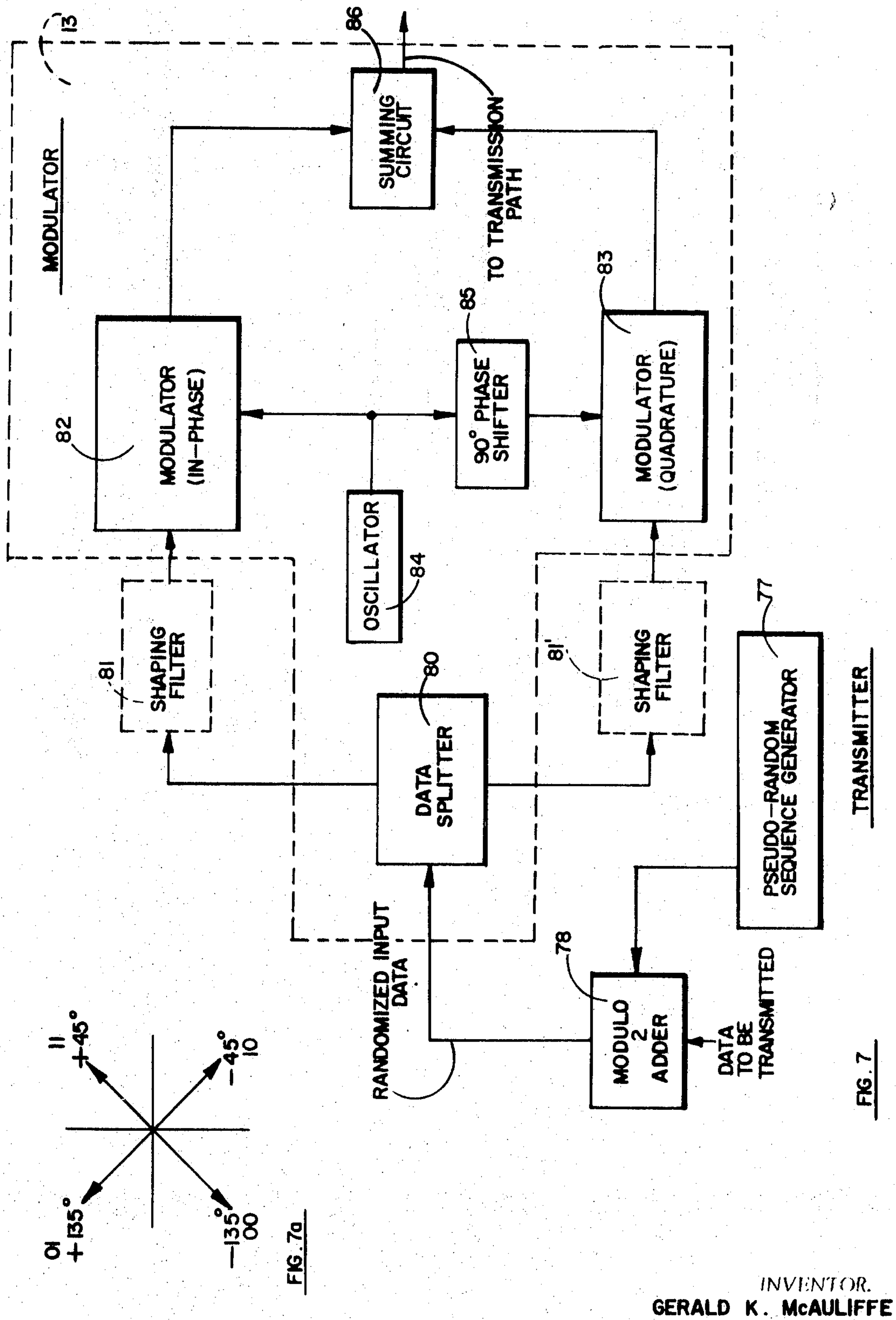

FIG. 7 is a simplified block diagram of a two-channel transmitter with which the present signal correction system may be used.

FIG. 7*a* is a vector diagram illustrating the four-vector modulation of the transmitter shown in FIG. 7.

Figure 8:
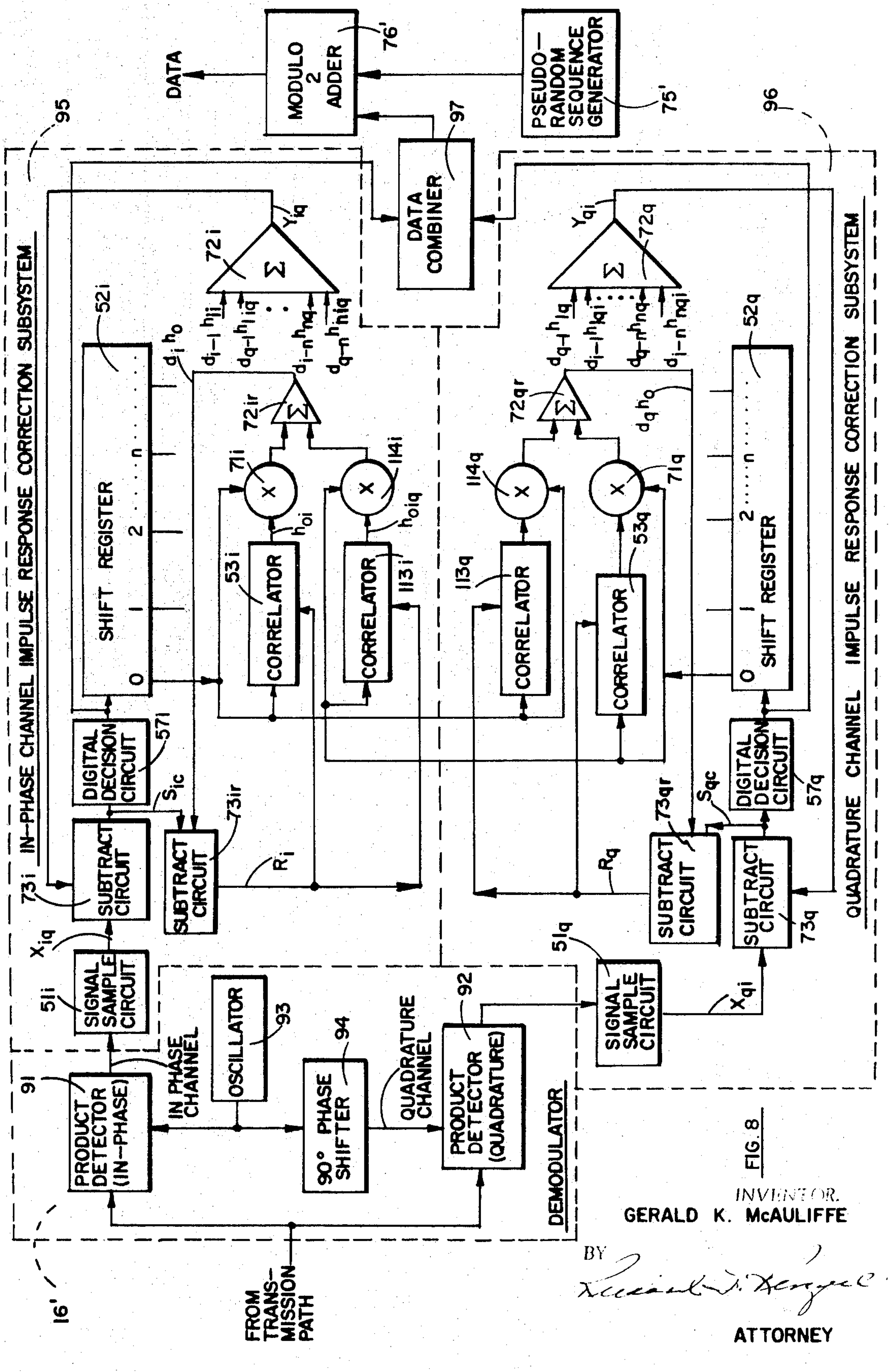

FIG. 8 is a block diagram of the receiver portion of two-channel data transmission system utilizing another embodiment of the signal correction system of the present invention.

Figure 9B:
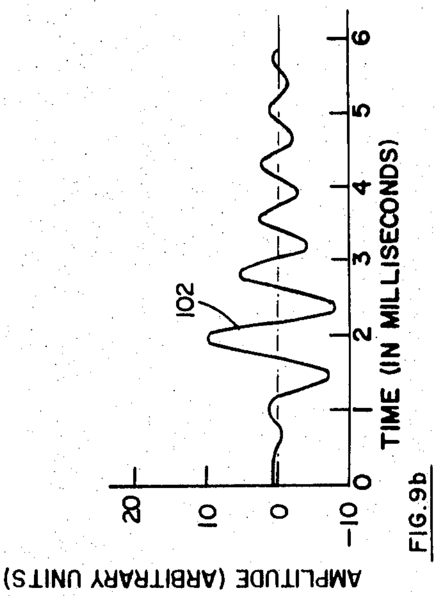
Figure 9A:
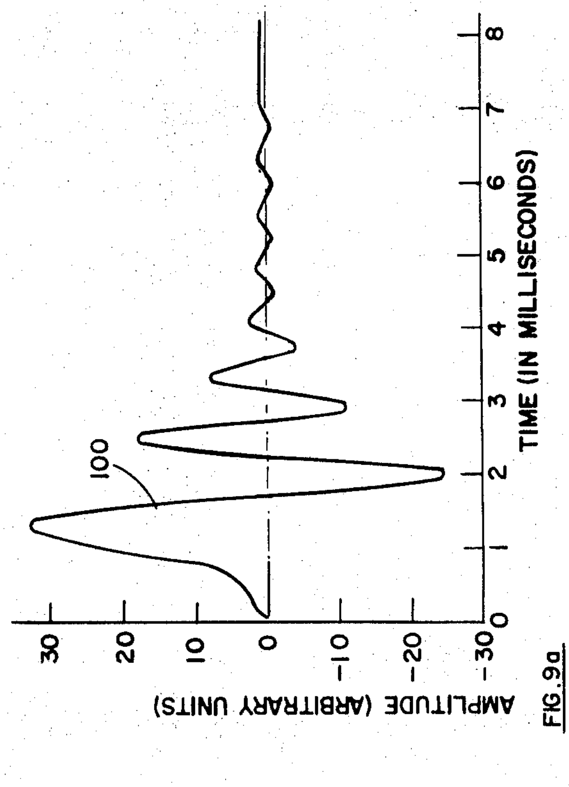

FIG. 9*a* shows typical transmission line impulse response characteristics measured in the in-phase channel of the data transmission system of FIGS. 7 and 8.

FIG. 9*b* shows the cross-channel impulse response measured in the in-phase channel of the data transmission system of FIGS. 7 and 8, but resultant from simultaneous data transmission on the quadrature channel.

Figure 10B:
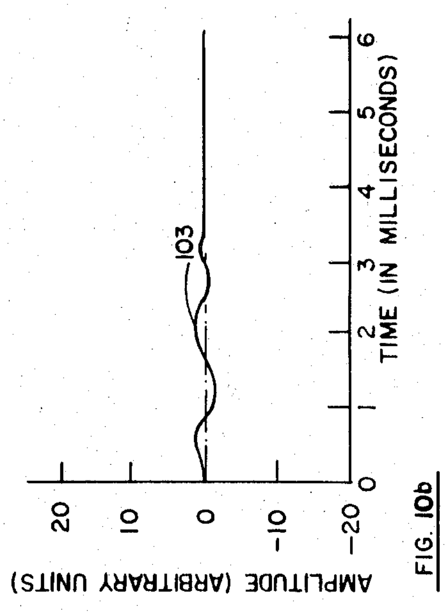
Figure 10A:
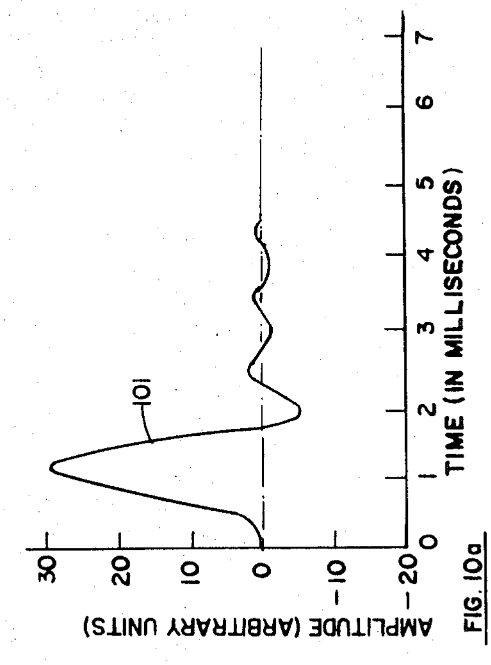

FIGS. 10*a* and 10*b* show typical in-phase and cross-channel impulse response characteristics when using cosine-squared shaping filters in the data transmission system.

DESCRIPTION OF THE PREFERRED EMBODIMENTS

A block diagram of a preferred embodiment of the signal correction system of the present invention is shown in FIG. 1. The system accepts a signal from a transmission channel, which signal contains the digital data as originally transmitted but in a form which is distorted due to the impulse response of the channel. The system of FIG. 1 examines this received signal and determines digitally the impulse response of the associated transmission channel. A correction signal then is generated which, when combined with the received signal, allows recovery of the transmitted digital data in undistorted form. The system is adaptive; that is, changes in the impulse response characteristics of the transmission channel continuously are sensed and compensated for.

Considering now a typical transmission channel 12 such as that shown in block diagram form in FIG. 2, since digital data cannot be transmitted directly on a voice communication line (since such paths are not adapted to handle DC signals), a modulator 13 is used. Typically, modulator 13 may produce an audiofrequency output which is modulated in amplitude, frequency, or phase by the input data. This digital input data itself may be in the nonreturn-to-zero form (see FIG. 4*a*) or in pulse form (see FIG. 4*b*). If desired, the input data may be shaped prior to modulation by a filter 14, the function of which is described hereinbelow.

The output of modulator 13 is carried by a transmission path 15 to a distant location where it is processed by a demodulator 16 to produce a received signal. This received signal contains the input data in a form distorted due to the overall impulse response characteristics $h_t$ individual to transmission channel 12. This impulse response $h_t$ represents the combined distortion produced by shaping filter 14, conversion to and from audio form by modulator 13 and demodulator 16, and the delay and amplitude distortion characteristics individual to the transmission path 15.

In a particular system, the signal distorting characteristics of shaping filter 14, modulator 13, and demodulator 16 may be known and thus readily compensated for. On the other hand, the distortion characteristics of a typical transmission path 15 may be unknown prior to detection during transmission and may change with time. Should transmission path 15 include a telephone line, severe delay distortion will be introduced into the transmission path.

Figure 3A:
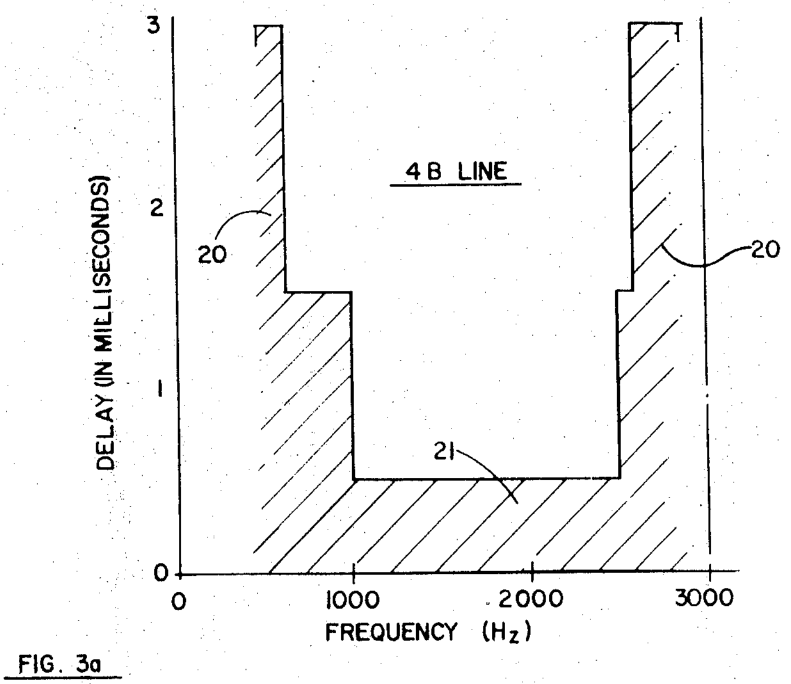
FIGS. 3*a* and 3*b* are graphs showing typical delay characteristics of two classes of commercial telephone lines.
Figure 3B:
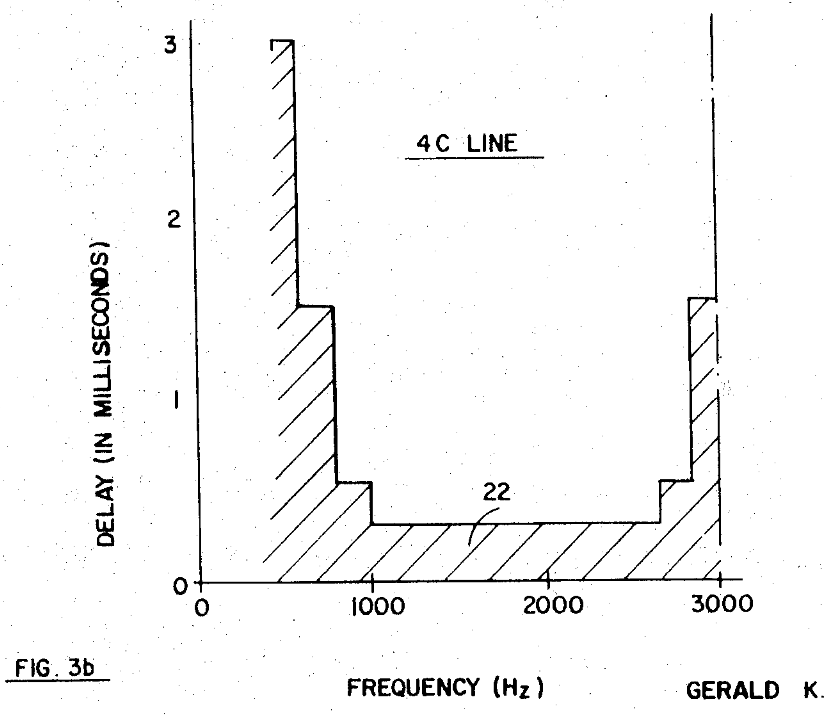

Class 4B or 4C commercial telephone transmission lines, which were designed primarily for voice transmission, have delay characteristics shown graphically in FIGS. 3*a* and 3*b*, respectively. Such lines may be used to transmit data. As illustrated by shaded regions 20 (see FIG. 3*a*), a Class 4B line may exhibit as much as 3 milliseconds delay for signal components below 500 Hz., and above 2,800 Hz., while the same Class 4B line (see shaded region 21) may have a delay of less than 500 microseconds between 1,000 Hz. and 2,600 Hz. Similarly, a Class 4C line may exhibit a delay of less than 300 microseconds at frequencies between 1,000 Hz. and 2,600 Hz. (see designation 22 of FIG. 3*b*) while exhibiting longer delay times at other frequencies. These delay characteristics result in considerable distortion of a modulated digital signal transmitted over a telephone line. In fact, it is this delay distortion which in the past has caused most of the difficulty in facilitating high-speed data transmission.

The overall impulse response $h_t$ of a typical transmission channel is indicated by waveform 25 of FIG. 4*c*. Waveform 25 thus represents the appearance of a received signal obtained from transmission channel 12 (see FIG. 2) if the input data were to comprise a single, isolated pulse. Note that waveform 25 reaches a positive maxima $h_o$ at time $t_o$ (represented by vertical line 30) and contains trailing components which may be negative or positive in value. The amplitudes of waveform 25 at succeeding data transmission times $t_1$ and $t_2$ are represented by $h_1$ (line 31) and $h_2$ (line 32), respectively.

If consecutive data bits are fed to transmission channel 12 at a sufficiently slow rate, the received signal would consist of consecutive bursts, each having the general appearance of waveform 25. In such instance, very little distortion of the signal will occur due to ringing associated with the previously received pulse. Such a system would allow error-free data transmission, but would suffer from the serious inconvenience that the minimum time between succeeding data bits must correspond to the period of ring-out of impulse response illustrated by typical waveform 25. Obviously, this provides a severe handicap not compatible with the high data transmission speeds required today.

Typically, the input data to be sent over a transmission channel may be accepted either in nonreturn-to-zero form (see FIG. 4*a*) or in pulse form (see FIG. 4*b*). In either case, the timing between successive data bits (e.g., between Mark 40 or 40*a* and succeeding Space 41 or 41*a*) may be considerably less than the total "ring-out" time of impulse response shown by waveform 25. When such consecutive input data bits are fed to transmission channel 12, the resultant received signal may have the form illustrated by signal waveform 45 of FIG. 4*d*. Note that signal waveform 45 corresponds to the superposition (algebraic sum) of the individual impulse response waveforms 25, 26, 27, and 28 ... corresponding respectively to transmitted data pulses 39, 40, 41, 42 ...

It is evident that typical received signal 45 exhibits considerable distortion due to the "ring-out" of the impulse response waveforms associated with transmission of the preceding data pulses. As a result, the amplitude of received signal 45 is not the same at each data sampling time $t_o$, $t_1$, $t_2$, $t_3$, ... For example, the amplitude of received signal 45 at time $t_o$ (corresponding to the reception of Mark 39 in FIG. 4*a*) has an amplitude of +4 whereas at times $t_1$ and $t_3$ (corresponding to the transmission of Mark 40 and Mark 42, respectively) received signal 45 has amplitudes of +2 and +7, respectively. Similarly, the amplitude of received signal 45 at time $t_2$ (corresponding to the transmission of Space 41) has an amplitude of −5. Under extreme conditions, depending on the impulse response of the particular transmission channel used and on the data transmitted, the sign of the received signal occasionally may be in error, implying that a Mark has been received when in fact Space has been transmitted. Similarly, the received signal might be negative (implying reception of a Space) when it should be positive (since a Mark actually was transmitted). Moreover, it is apparent that if multilevel transmission is used (wherein both the amplitude and the sign of the received signal are representative of data) erroneous interpretation of the received data well may result due to impulse response effects of the transmission channel.

The present signal correction system measures the impulse response of the transmission channel being used and generates a correction signal which, when combined with received signal 45, will assure correct recovery of the transmitted data earlier in the transmission thereof.

Referring to FIG. 1, the received signal (e.g., signal 45 of FIG. 4*d*) obtained form typical transmission channel 12 (see FIG. 2) is coupled to signal correction means 70 wherein the received signal is sampled, corrected for impulse response previously detected, if any, and then the corrected signal $S_c$ is coupled to impulse response determination means 50. Impulse response determination means 50 measures the impulse response of the transmission channel being used and produces a set of outputs $h_0$, $h_1$, $h_2$, ..., $h_n$, ... indicative of the amplitude of impulse response waveform 25 at corresponding data sample times. For example, (referring to typical impulse response curve 25 of FIG. 4*c*) impulse response determination means 50 would produce outputs indicative of $h_o$ at time $t_o$ (having a value of +4 and corresponding to amplitude 30 of FIG. 4*c*), and $h_2$ having an amplitude of +1, occurring at time $t_2$, and corresponding to amplitude 32 of FIG. 4*c*.

The output $h_o$ is the correlator output corresponding to the amplitude of the current data bit as learned and, for purposes of explanation, $p_o$ assumed to be less than the value of +4 prior to the learning period of 20 milliseconds, for example, to provide a residual signal $R_t$. The residual signal represents the uncorrected impulse response distortion in the corrected signal $S_c$ and is derived by subtracting the best approximation of the actual level of the current data bit indicated by the value of $d_t h_o$ from the corrected signal $S_c$ in a subtract circuit 73*r*.

Signal correction means 70 then utilizes the remainder of the set of signals (indicative of values of $h_t$) to provide an appropriate correction signal $Y_t$ which, when combined with the received signal, will produce a corrected received signal corresponding exactly to the input data fed into transmission channel 12 (see FIG. 2).

Referring again to FIG. 1, received signal 45 first enters signal sample circuit 51. The function of signal sample circuit 51 is to measure the amplitude of the received signal 45 at each data sample time $t_o$–$t_n$ and to provide an output voltage $X_t$, the amplitude of which is constant for 1-bit time and equal in amplitude to the signal received at the time. Thus, in FIG. 4*d*, signal $X_i$ is shown by dashed line 47, which corresponds to received signal 45. In this example, signal 45 is sampled at times $t_o$, $t_1$, $t_2$, ... the occurrence times of strobe pulses 46.

One embodiment of signal sample circuit 51 is shown in FIG. 5. As indicated therein, received signal 45 is fed via a gate 68 to a capacitor 58. Gate 68 is normally closed, but is opened by the applying strobe pulse 46, generated once each bit time. As illustrated in FIG. 4*d*, strobe pulses 46 have a time duration considerably shorter than one bit time and, in a system designed to handle data at a rate of 4800 bits per second, may have a duration on the order of 50 microseconds.

Referring still to FIG. 5, when strobe pulse 46 occurs, the received signal passes through gate 68 and charges capacitor 58 to a voltage having a polarity corresponding to that of received signal 45 at the occurrence time of strobe pulse 46. An operational amplifier 59, which has a very high input impedance, samples the voltage present on capacitor 58 and provides a low impedance output having a magnitude and sign indicative of the magnitude and sign of the voltage stored on capacitor 58. Because of the high input impedance of amplifier 59, capacitor 58 is not discharged between the occurrence of successive strobe pulses 46.

When the succeeding strobe pulse occurs, capacitor 58 is discharged (via gate 68) and subsequently recharged to the new value of the received signal. Thus, the output of amplifier 59 comprises a signal $X_i$ illustrated by the dashed line 47 in FIG. 4*d*.

The amplitude $X_i$ of the sampled received signal may be represented by the following equation:

$$X_i = d_i h_o + d_{i11} h_1 + d_{i12} h_2 + \ldots + d_{i1n} h_n + \ldots \qquad (1)$$

where $i$ = 1, 2, 3, ... indicates which bit (1st, 2nd, 3rd, ...) in the data sequence has just been received. The value of $d_{i1n}$ is +1 if the signal received at the $(i-n)^{th}$ time was interpreted (by a digital decision circuit 57) as a binary 1, or −1 if interpreted as a binary 0. The values of $h_i$ represent the amplitudes of the impulse response waveform 25 as bit sample times of strobe pulses 46 and $d_i h_o$ is the amplitude level of the 1st data bit 39 stored in –0– cell of the shift register 52 at time $t_o$, for example.

Referring to FIG. 4*d*, it may be seen that equation (1) indeed represents the height of curve 47 at the $i^{th}$ bit time. For example, at time $t_3$ the $i=4^{th}$ data bit (corresponding to bit 42 in FIG. 4*a*) has just been received. Since bit 42 is a binary 1, $d_i=d_4=+1$. The preceding $(i-1)^{th}$ bit received (corresponding to bit 41 in FIG. 4*a*) was a binary 0, hence $d_{i11}=d_3=-1$. Similarly, $d_{i12}=d_2=+1$ (since bit 40 is a binary 1) and $d_{i13}=d_1$ =+1 (since bit 39 also is a binary 1). Substituting into equation (1), it is apparent that $$X_4=(+1)(4)+(-1)(-2)+(+1)(1)+(+0)=4+2+1=7$$

where of course $h_o=4$, $h_1=-2$, $h_2=+1$, and $h_3=0$ as apparent form impulse response waveform 25 in FIG. 4*c*. Note that equations (1) and (2) thus correctly described the amplitude of curve 45 (see FIG. 4*d*).

Referring again to FIG. 1, the received data from signal correction means 70, i.e., subtract circuit 73, is fed via digital decision circuit 57 into a digital shift register 52.

Digital decision circuit 57 provides a binary 1 input to shift register 52 if the signal from correction means 70 is positive, and a binary 0 if the signal is negative. In a preferred embodiment, shift register 52 can store at least the current data bit and that number of bits which may be transmitted during the ring-out period of the impulse response of the transmission channel in use. Thus, in our example, where the impulse response of transmission channel 12 is represented by the waveform 25 (FIG. 4*c*), shift register 52 should provide storage for at least three bits since after 3-bit time periods, the tail of input response waveform 25 is of a negligible amplitude. It should be apparent that the –0– cell 54 of shift register 52 contains the current data bit received at $(i)^{th}$ data time and –1– cell 54*a* then contains the binary bit received at the $(i-1)^{th}$ data time. Similarly, –2– cell 54*b* contains the bit received at the $(i-2)^{th}$ data time and the $n^{th}$ cell 54*n* contains the bit received at the $(i-n)^{th}$ data time.

Referring still to FIG. 1, each cell 54, 54*a*, 54*b*, ... 54*n*, ... of shift register 52 provides an input for corresponding one of identical correlators 53, 53*a*, 53*b*, ... 53*n*, ... It should be noted that the output of correlator 53 is not used in formation of the correction signal $Y_i$ in the same manner as the outputs of the other correlators 53*a*, 53*b*, ... 53*n*, ... Instead, the output of correlator 53 via digital multiplier 71 provides an input to subtract circuit 73*r* to produce the residual signal $R_i$. Thus, the output of digital multiplier 71 provides a signal $d_i h_o$ corresponding to the amplitude of the current data bit. The signal $d_i h_o$ is subtracted from the corrected signal $S_c$ in subtract circuit 73*r* to provide the signal $R_i$ which corresponds to the residual distortion in the corrected signal $S_c$. It is this residual signal $R_i$ which provides the input to correlator 53*a*, 53*b*, ... 53*n* ... for correlation of the impulse response of the received signal 45. The outputs $h_1$, $h_2$ ... $h_n$ are applied to summing network 72 to produce the correction signal $Y_i$. Since the residual signal $R_i$ necessarily decreases to zero as the correction signal $Y_i$ approaches the impulse response distortion of the transmission channel, the correlation networks must provide integration circuits 56, 56*a*, 56*b* ... 56*n* ... which perform actual integration of the output of digital multipliers 55, 55*a*, 55*b* ... 55*n* ... Correlators 53, 53*a*, 53*b* ... 53*n* ... each comprise a digital multiplier 55, 55*a*, 55*b* ... 55*n* ..., respectively and an integrator 56, 56*a*, 56*b* ... 56*n* ..., respectively, a preferred embodiment of which is shown schematically in FIG. 6. It should be noted that it is because of the decrease in amplitude of the residual signal $R_i$ as "learning" proceeds that noise introduced into the correction system is negligible after the short "learning" period required in the present system, e.g., 20 milliseconds.

The operation of correlators 53, 53*a*, 53*b* ... 53*n* ... may be understood by reference to typical correlator 53*n*, associated with $n^{th}$ cell 54*n* of shift register 52. Digital multiplier 55*n* provides an output to integrator 56*n* with either the same or opposite sign which has the same amplitude level as $KR_i$ (K is a constant less than unity), depending on whether the bit stored in cell 54*n* is a binary 1 or binary 0. That is, digital multiplier 55*n* maintains the sense (polarity) of $R_i$ if $d_{i1n}=+1$ (binary 1) or changes the sense (inverts the polarity) of $R_i$ if $d_{i1n}+-1$ (binary 0).

A preferred embodiment of the correlators is shown by correlator 53*n* in FIG. 6 and includes digital multiplier 55*n* and integrator 56*n*. Digital multiplier 55*n* comprises an operational amplifier 60 having an input resistance 61 and a shunt resistance 62. As is well known to those skilled in the art, such an operational amplifier exhibits unity gain but inverts the polarity of the input signal. Digital multiplier 55*n* also comprises two identical gates 63 and 64 which are controlled by complementary inputs $d_{i\cdot n}$ and $\overline{d_{i-n}}$. As shown in the truth table of FIG. 6*a*, when a binary 1 is stored in the $n^{th}$ cell 54*n* of shift register 52, gate 63 will be open. At the same time, the complementary input (represented by $\overline{d_{i-n}}$) to gate 64 will be false; hence gate 64 will be closed. Thus, the $R_i$ input from subtract circuit 73*r* will appear at output node 65 of digital multiplier 55*n* (via open gate 63) without a change of sign. Alternately, if cell 54*n* should contain a binary zero, the input to gate 63 will be false, while the input to switch 64 will be true. In this instance, the input from subtract circuit 73*r* will proceed to output terminal 65 via inverting operational amplifier 60. Thus, the output of digital multiplier 55*n* will be equal in magnitude, but opposite in polarity, to the input signal $R_i$.

Referring to the example illustrated by the waveforms of FIGS. 4*a*–4*c*, at time $t_3$, the sampled received signal $X_i$ (see waveform 47) has the value of +7. The data pulse received at time $t_2$ was a binary zero and now is stored in cell 54*a* of shift register 52; thus $d_{i11}$ represents a binary zero. Digital multiplier 55*a* interprets $d_{i11}$ in a sense which causes inversion of the sign of input $R_i$; hence the output of digital multiplier 55*a* is a negative signal. On the other hand, the signal received at time $i-2=t_1$ was a binary one, and this value is not stored in cell 54*b* of shift register 52. Thus, $d_{i12}$ represents a binary one, and this is interpreted by digital multiplier 55*b* in correlator 53*b* in a manner which does not invert the sign of residual signal $R_i$.

The output of digital multiplier 55*b* thus will be a positive signal.

As noted supra, the residual signal $R_i$ is the remaining distortion in the corrected received signal $S_c$ which is derived by subtraction of the correction signal $Y_i$ from the sample received signal $X_i$ ($X_i-Y_i=S_c$). The residual signal $R_i$ decreases to approximately zero as the correction signal $Y_i$ builds up to the impulse response distortion level ("learning" period). The advantage of the present system is in the short time period required to provide a correction signal which comes within 1 percent of its final value, i.e., short learning of 20 milliseconds, for example, as contrasted with prior adaptive systems requiring 10 to 20 seconds learning time, i.e., time period measured from the time of the first data bit of the transmission to the time the correction signal is within 1 percent of its final value.

In view of the foregoing, the residual signal $R_i$ is derived by noting that correlator outputs $h_1, h_2 \ldots h_n \ldots$ are the best approximations of the amplitudes and signs (+ or −) of the impulse response of the respective previous data bits. Accordingly, the residual distortion is expressed as follows:

$$R_i = X_i - [\hat{d}_i\hat{h}_0 + \hat{d}_{i-1}\hat{h}_1 + \hat{d}_{i-2}\hat{h}_2 + \hat{d}_{i-n}\hat{h}_n] \qquad (2)$$

wherein $\hat{d}_i, \hat{d}_{i-1}, \hat{d}_{i-2} \ldots \hat{d}_{i-n}$ represents the best approximations of the data bits as provided by the decision circuit 57 and stored in the respective cells of shift register 52; and wherein $\hat{h}_{i0}, \hat{h}_1, \hat{h}_2 \ldots \hat{h}_n$ represent the best approximations of the actual amplitudes of the impulse response distortion of the respective data bits. Substitution of equation (1) for $X_i$ in equation (2) is made as follows when we assume no data errors:

$$R_i = d_i(h_0-\hat{h}_0) + d_{i-1}(h_1-\hat{h}_1) + d_{i-2}(h_2-\hat{h}_2) \qquad (3)$$
$$\ldots + d_{n11}(h_n-h_n) \ldots$$

then, for example, $h_1$ is derived from equation ($d$) as follows:

$$d_{i-1}R_i = d_i d_{i-1}(h_0-\hat{h}_0) + (h_1-\hat{h}_1) + d_{i-1}d_{i-2}(h_2-\hat{h}_2) \qquad (4)$$

or $$d_{i11}R_i = d_i d_{i11}\Delta h_o + \Delta h_1 + d_{i11}d_{i12}\Delta h_2 \qquad (5)$$

Since the signals are sufficiently random, averaging over the time period of integration of each of the terms $d_i d_{i11}\Delta h_o$ and $d_{i11}d_{i12}\Delta h_2$ will be zero and only the sign of $h_1$ is invariant; therefore, equation (5) simplifies to:

$$d_{i11}R_i = \Delta h_1 \text{ (or) } \int d_{n11}R_i^{dt} = h_1 \qquad (6)$$

In practice, noise is often present in the received signal and residual signal 45 when the residual signal $R_i$ is large during the early part of the "learning" period. Thus, it is important in the determination of the amount of residual signal $R_i$ which is to be used in the correlators (FIG. 1) and more particularly the portion of the residual signal $R_i$ which is used in integrator 56 in FIG. 6, for example. As shown, only a portion of the residual signal $R_i$ is coupled to the integrator 56*n* from the digital multiplier 55*n* via the adjustable tap of the voltage divider 67*r*. Thus, only a portion of the residual signal $R_i$ is integrated and noise contributions will average out in the "learning" period since they also are random in polarity. This portion of the residual signal $R_i$ provides for incrementing of each of the $h_o\ h_1\ h_2 \ldots h_n$ values and a larger increment is used for a larger residual and vice versa, i.e., a functional relationship including the relationship in which the increments are proportional to the residual signal. The selected portion of the residual signal $R_i$ providing excellent results is in the range of values from one-eighth to one-sixteenth which is designated K and is preferably substantially less than unity. The learning time period is faster when K is large. However, when K is too large, slower learning or even divergence may occur. A small value of K, i.e., $K$=0.1 provides learning within 1 percent of the final value (or final correction signal $Y_1$) after 80 (2-bit) characters, e.g., in 20 milliseconds. When $K$=0.1, for example, noise is reduced by 20 db. in the integration and the effects of noise on the rate of learning process is negligible.

As shown in FIG. 1, the outputs of digital multipliers 55*a*, 55*b* ... 55*n* ... respectively are fed to integrators 56*a*, 56*b* ... 56*n* ... The function of integrators 56*a*, 56*b* ... 56*n* ... is to provide actual integration of the output voltage level of the associated digital multipliers 55*a*, 55*b* ... 55*n* ... over a time period. While this period is by no means critical, in a preferred embodiment, the period over which the integration is taken may be on the order of 90 bit time periods. Therefore, the rate at which the present system adapts itself to variations in the impulse response of transmission channel 12 will depend in part on the time constant of integrators 56*a*–56*n* and in part on the constant K. It has been found that when integrators 56–56*n* have a relatively short time constant, e.g., less than 100 bit times, the correction system will adapt itself very rapidly to the impulse response of transmission channel 12. In the prior copending application, it was noted that with such short time constants, noise may be introduced into the system by the integrators. In the present system, the received signal (and accompanying noise) is not applied to the correlators 53–53*n*, and only a portion of the residual signal $R_i$ is applied to the integrators. Thus, the noise no longer presents a problem as in the prior copending application and therefore, the integration time constant can be substantially reduced for faster "learning."

A preferred embodiment of integrators 56–56*n* is shown in FIG. 6 by a typical parallel feedback integrator 56*n*. Integrator 56*n* comprises an operational amplifier 60*a* and capacitor 66 in parallel, coupled to voltage divider 67 by series resistor 67. The level at the output $h_n$ remains unchanged including periods of change in transmission channels except in response to residual signal $R_i$ which may cause a change in level in either direction when integrated. An integrator of the type shown in FIG. 6 is known and disclosed in "Electronic Analog and Hybrid Computers" by Korn and Korn, McGraw-Hill, Inc. 1964 on pages 17 and 18.

If the incoming data is sufficiently random, approximately an equal number of binary ones and binary zeros will be received over a long duration of time. Further, the order in which individual binary ones and binary zeros occur will be essentially random. Under these conditions, the output signals from correlators 53, 53*a*, 53*b* ... 53*n* ... will represent respectively the values of $h_o, h_1, h_2, \ldots h_n \ldots$ both in magnitude and sign. Thus, correlators 53*a*–53*n* provide outputs indicative of the impulse response of transmission channel 12 being employed. In the example of FIGS. 4*a*–4*f*, the output signals of correlators 53*a* and 53*b* would represent in amplitude and sign the values of $h_1$ and $h_2$, respectively; these values are designated 31 and 32 (see input response waveform 25 of FIG. 4*c*).

As noted earlier, the received data is sufficiently random over a period of time the average valve of data bits ($d_{i1n}$) ($d_i$) will equal zero; similarly, the average value of ($d_{i1n}$) ($d_{i11}$) will equal zero, the average value of ($d_{i1n}$) ($d_{i12}$) will equal zero, and so forth. That is true since, on the average, the autocorrelation of successive data bits will be zero. That is, $d_{i\,11}$ and $d_i$ will assume the values −1 and −1 for approximately equal number of times and with roughly random occurrence. Thus, when integrated over time, these factors drop out of equation (4) and the only term remaining will be $\Delta h_n$ as shown by exemplary $\Delta h_1$ in equation (6). Alternately expressed, the output signals from any one of correlators 53*a*, 53*b* ... 53*n* ... may be represented by:

$$\int (d_{i\,1n})R_i dt = h_n \qquad (7)$$

It will be appreciated that cross-correlation by determination of residual distortion is employed in impulse response determination means 50 to measure the overall impulse response $h_t$ of transmission channel 12. Specifically, the system utilizes the principle that if the autocorrelation of the transmission channel input signal is a delta function, then the cross-correlation between the transmission channel input and output signals corresponds to the impulse response $h_t$ of the channel.

The power spectrum of a true delta function is constant over the entire frequency spectrum, and of course represents a physically unrealizable signal. However, it is not necessary to use a true delta function to obtain a measure of the impulse response of a transmission channel. Instead, an input signal containing finite power, the autocorrelation of which is approximately equal to a delta function and the power spectrum of which is approximately constant over the bandwidth of the channel may be used. A random, binary data sequence represents such a signal.

Referring again to FIG. 1, the output signals $h_1$, $h_2$ ... $h_n$ ... from impulse response determination means 50 (corresponding to the measured values of $h_t$) are used by signal correction means 70 to derive the correction signal $Y_t$ which, when combined with the sampled received signal 45 is subtract circuit 73, permits recovery of the original input data (corrected signals $S_c=X_t-Y_t$). Analysis of FIG. 4*c* indicates the nature of the required correction signal $Y_t$. For example, note that the amplitude of waveform 28 at time $t_3$ represents the portion of the received signal which results directly from transmission of binary one bit 42 (see FIG. 4*a* or 4*b*). However, at time $t_3$, received signal 45 (see FIG. 4*d*) also contains energy components contributed by individual waveforms 26 and 27, the impulse response curves resulting from the transmission of data bits 40 and 41, respectively. Thus, signal 26 contributes an energy component $+h_2$ (indicated by point 32') having an amplitude and sign equal to that of point 32. Likewise, waveform 27 contributes a component $+h_1$ (see point 31') having a magnitude equal to that of point 31 but of opposite sense (since waveform 27 results from transmission of a binary 0, as shown). It is apparent that the necessary correction signal $Y_t$ (at time $t_3$) will equal the sum of the impulse response amplitudes at points 31' and 32'. And, of course, this correction signal $Y_t=(+h_1+h_2)$ must be subtracted from received signal 45.

More generally, the desired correction signal $Y_t$ at a particular data sample time is given by the following equation:

$$Y_t=(d_{t\,11})h_1+(d_{t\,12})h_2+ \dots +(d_{t\,1n})h_n + \dots \quad (8)$$

where the various symbols correspond to those defined hereinabove.

To obtain this correction signal $Y_t$, signal correction means 70 (see FIG. 1) utilizes a plurality of digital multipliers 71*a*, 71*b*, ... 71*n* ... each of which accepts, as one input, the output from corresponding correlators 53*a*, 53*b* ... 53*n* ... of impulse response determination means 50. As second input, each digital multiplier 71*a*, 71*b* ... 71*n* ... receives a signal indicative of the datum present in the corresponding cell 54*a*, 54*b* ... 54*n* ... of shift register 52. Thus, for example, digital multiplier 71*a* receives as a first input a signal (indicative of the impulse response value $h_1$) form correlator 53*a*. Digital multiplier 71*a* also receives an input $d_{t11}$ indicative of whether a binary one or binary zero (received one bit time earlier) now is stored in cell 54*a* of shift register 52.

Digital multipliers 71*a*, 71*b* ... 71*n* ... each are identical in function to digital multipliers, 55*b* ... 55*n* ... and each may utilize the circuit shown in FIG. 6. THe output of typical digital multiplier 71*n* will be a signal having an amplitude equal to that of impulse response signal $h_r$ (from correlator 53*n*), and having a polarity which is the same as that of $h_n$ (if $d_{t1n}=+1$, indicating a binary 1 in cell 54*n*) or opposite that of $h_n$ (if $d_{t1n}=-1$, indicating a binary 0 is stored in cell 54*n* of shift register 52). Thus, it is apparent that the output of $n^{th}$ digital multiplier 71*n* is given by $(d_{t1n})h_n$. The desired correction signal $Y_t$ then is obtained by summing the outputs of digital multipliers 71*a*, 71*b* ... 71*n* ... is summing amplifier 72. THe correction signal $Y_t$ obtained from amplifier 72 is represented exactly by equation (8) above, and may have the general appearance illustrated in FIG. 4*e* after the learning period.

To reconstruct the original input data, the correction signal $Y_t$ from summing amplifier 72 is combined with the sampled received signal $X_t$ iin the subtract circuit 73 to produce a corrected received signal $S_c$. Subtraction of the final correction signal $Y_t$ (in FIG. 4*e*) from sampled received signal $X_t$ produces the corrected received signal $S_c$ illustrated in FIG. 4*f*. Note that in this idealized exampled, corrected received signal $S_c$ corresponds exactly to the transmission channel input data indicated by the data signals of FIGS. 4*a* or 4*b*. In addition, the amplitude of each of the received data pulses (in FIG. 4*e*) are equal, i.e., the ambiguity previously associated with received signal 45 has been eliminated completely.

During the impulse response learning period, signal $Y_t$ may not be exactly equal to the signals of FIGS. 4*a* or 4*b*. For this reason, digital decision circuit 57 in FIG. 1 is utilized to produce a logic "1" if signal $S_c$ is positive and a logic "o" if signal $S_c$ is negative. The digital output of digital decision circuit 57 is then always in the proper form to feed digital shift register 52 of FIG. 1.

From the above description, it is apparent that for most accurate measurement of the current data bit $h_o$ and impulse response values $h_1$, $h_2$ ... $h_n$ ... and hence for optimum operation of the present impulse response correction system, it is desirable that the transitted data be as nearly random as possible. Randomness of the data may be ensured by combining the digital information to be transmitted with the output of a digital pseudorandom sequence generator in a modulo-2 adder. Modulo-2 addition of a pseudorandom sequence with the input information will produce a data sequence which itself is random. To recover the original information, the corrected received signal may be combined with the output of an pseudorandom sequence generator in another module-2 adder.

Referring to FIG. 1, if the input data introduced into transmission channel 12 has been combined with a pseudorandom sequence, the data output from subtract circuit 73 may be combined in a modulo-2 adder 76 with the output of a pseudorandom sequence generator 75. If sequence generator 75 is configured to produce a pseudorandom sequence identical to that used at the transmitter, the output from modulo-2 adder 76 will be an exact replica of the originally transmitted data. The design and operation of pseudorandom sequence generators are well known to those skilled in the art, and are described, for example, in the reference "Digital Communications with Space Applicaions" by S. M. Golomb, et al., Prentice-Hall, New Jersey (1964). Modulo-2 adder 76 comprises a circuit which functions in accordance with the following truth table:

TABLE I

| Output from Pseudorandom Sequence Generator | Data to be Transmitted | Output of Modulo-2 Adder |
|---|---|---|
| 0 | 0 | 1 |
| 1 | 0 | 0 |
| 0 | 1 | 0 |
| 1 | 1 | 1 |

Alternately, the use of linear sequential coding networks in conjunction with the data to be transmitted can produce a transmitted sequence which is approximately random. To recover the original data, the corrected digital signal from digital decision circuit 57 may be fed through the inverse of the linear sequential coding network used at the transmitter. Linear coding networks useful with the present correction system are described in the reference article entitled "The Synthesis of Linear Sequential Coding Networks" by D. A. Huffman, printed in the book "Information Theory," Colin Charry (Ed) Academic Press, New York (1956). Use of linear coding networks eliminates the problem of synchronizing the transmitter and receiver pseudorandom sequence generators.

To insure maximum utilization of transmission channel, it is possible to utilize two orthogonal subchannels with multilevel amplitude modulation on each subchannel. With this arrangement, more than one bit of information may be transmitted in each Nyquist interval. (A Nyquist interval is that time period in which successive impulses may be transmitted by a channel without interference between the peaks of the received pulses; the corresponding Nyquist rate is a rate in bits-per-second numerically equal to twice the available channel bandwidth in cycles per second.)

An example of such a modulation system without the multilevel amplitude modulation is illustrated by the block diagrams in FIG. 7 (transmitter section) and FIG. 8 (receiver section). This system transmits a four-vector signal generated by combining two AM waves in quadrature. The operation of appropriate modulator and demodulators for such a four-vector modulation system is described on pages 202 and 203 of the book entitled, "Data Transmission" by William R. Bennett and James R. Davey, published by McGraw-Hill Book Company, New York, 1965. The system depicted in FIGS. 7 and 8 utilizes pseudorandom sequence generation to insure that the data sent over the transmission channel will be random. Further, the system utilizes correction circuitry representing a second embodiment of the present invention. This latter embodiment not only compensates for the impulse response of the in-phase and quadrature transmission channels, but also compensates for distortion due to cross-channel interaction.

Referring to FIG. 7, there is shown a simplified block diagram of the transmission portion of a digital data communications system utilizing four-vector modulation. The data to be transmitted first is randomized by combination in a modulo-2 adder 78 with the output from a pseudorandom sequence generator 77. These items function in a manner identical to that described hereinabove tin conjunction with FIG. 1. The randomized input data obtained from modulo-2 adder 78 is analogous to the input data fed to transmission channel 12 illustrated in FIG. 2. Shaping filters 81 and 81' (in FIG. 7) correspond to shaping filter 14 of FIG. 2 and the remainder of the blocks in FIG. 7 correspond to modulator 13 of FIG. 2.

Referring again to FIG. 7, the randomized input data enters a data splitter 80, the function of which is to direct alternate input data bits first to an in-phase modulator 82 and then to quadrature modulator 83. That is, the first data bit received by data splitter 80 will be directed to modulator 82, the second data bit to modulator 83, the third data bit to modulator 82, the fourth data bit to modulator 83, and so forth. The digital logic required to accomplish the function of data splitter 80 is well known to those skilled in the art.

The data bits fed to modulators 82 and 83 pass through shaping filters 81 and 81' respectively, which filters in a preferred embodiment may be of the cosine-squared variety. Preshaping of the input data results in a reduction of the ringing associated with the received data pulses. For example, the graph of FIG. 9*a* shows the in-phase channel impulse response characteristics 100 of a typical 4B telephone transmission path using a carrier frequency of 1800 Hz., but using no pulse-shaping filter. Note in FIG. 9*a* that considerable ringing is present, i.e., that the tail of impulse response curve 100 has many excursions of considerable amplitude. By preshaping the input data through a cosine-squared filter such as shaping filter 81, the effective impulse response of the same channel (as shown by waveform 101 of FIG. 10*a*) exhibits significantly less ringing than is experience when the input data is not filtered. This improvement in the impulse response characteristics of the transmission channel itself aids in reducing the distortion of transmitted data.

Referring again to FIG. 7, in-phase modulator 82 accepts a carrier from an oscillator 84, the frequency of which is within the passband of transmission path 15. For applications using commercial telephone transmission lines, oscillator 84 may have a frequency in the order of 1800 Hz. The output of modulator 82 comprises a carrier which corresponds in phase to the output of oscillator 84 when a binary one is received from shaping filter 81, and which is 180° of phase e with respect to the signal from oscillator 84 when the data bit from shaping filter 81 is a binary zero.

Quadrature modulator 83 is fed by a signal from oscillator 84, which signal is shifted by a phase shifter 85 to lead by 90° the oscillator output. When a binary one is received from shaping filter 81', the output of quadrature modulator 83 will comprise a carrier which is in phase with the output of phase shifter 85, (i.e., which leads the output of oscillator 84 by 90°). Alternately, when the output from shaping filter 81' is a binary zero, the output of quadrature modulator 83 is a carrier which is 180° out of phase with respect to the output of phase shifter 85 (i.e., which lags the output of oscillator 84 by 90°).

The outputs of in-phase modulator 82 and quadrature modulator 83 are combined in a summing circuit 86 to provide a single output to transmission path 15 (see FIG. 2). This output signal has a frequency corresponding to that of oscillator 84, and exhibits periodic phase changes. Ideally, the net phase shift of this signal will be either +45°, −45°, +135°, or −135°.

If two successive binary 1 bits are received by data splitter 80, the output from in-phase modulator 82 will be an audio signal whose phase lags that of the output of quadrature modulator 83 by 90°. Thus, the net phase shift of the output signal from summing circuit 86 will be +45°. As indicated by the idealized phase diagram of FIG. 7*a* if two successive binary zeros are received by data splitter 80, this will result in a net phase shift of −135°. Should successive bits be a zero and a one, a phase change of + ° will occur. Similarly, a change of −45° will occur for two consecutive binary one and zero data bits.

FIG. 8 is a block diagram of a data transmission system receiver section which may be used in conjunction with the transmission section illustrated in FIG. 7. An incoming signal from the transmission path is fed simultaneously to an in-phase product detector 91 and a quadrature product detector 92 in a demodulator 16'. Product detector 91 also accepts a carrier from an oscillator 93 at a frequency identical to that of oscillator 84 (see FIG. 7). Similarly, product detector 92 accepts a carrier generated by oscillator 93 but shifted +90° by a phase shifter 94. The operation of demodulator 16' is well known to those skilled in the art and is described, for example, beginning on page 203 of the book "Data Transmission" referenced hereinabove.

The output of in-phase product detector 91 comprises a signal, not unlike that depicted by waveform of received signal 45 of FIG. 4*d*, which contains alternate bits of the original input data. Distortion of this in-phase channel signal in part will reflect the impulse response characteristics $h_i$ of the transmission channel utilized. This in-phase channel impulse response may correspond to the typical waveforms of FIGS. 9*a* (no preshaping filter) or FIG. 10*a* (shaping filter 81 used). The output of in-phase product detector 91 also will exhibit cross-channel distortion effects resulting from the simultaneous transmission of alternate data bits in the quadrature channel. This cross-channel distortion taken alone may be represented as an impulse response between the quadrature and in-phase channel, and typically may have the appearance of waveform 102 in FIG. 9*b* (if no shaping filters are used in the transmission channel), or that of waveform 103 in FIG. 10*b* (using cosine-squared filtering). Note in this regard that use of a cosine-squared filter reduces considerably the cross-channel distortion.

The output of quadrature channel product detector 92 will be a signal similar to that of signal waveform of received signal 45 in FIG. 4*d*, which contains the alternate data bits not recovered from the in-phase channel. This quadrature channel signal itself will be distorted due both to the impulse response characteristics of the transmission channel and also to cross-channel intermodulation effects from the in-phase channel.

The data receiver shown in FIG. 8 utilizes separate correction subsystems 95 and 96 for each of the in-phase and quadrature channels. Further, each correction subsystem is configured to derive both the cross-channel and the in-channel impulse response. A combined correction signal compensating for distortion due to both of these sources is derived and used to correct the received signal 45 in each of the associated in-phase and quadrature channels.

In view of the detailed discussion of the system operation in FIG. 1, the following description of the data receiver of FIG. 8 is limited to a discussion of the additional circuitry provide in the subsystems and the operation thereof. Accordingly, only correlators for deriving the amplitude of the current data bits (stored in –0– cells) is shown in FIG. 8 and additional correlators and digital multipliers for deriving inputs $d_{i11}h_{ii}$, $d_{q11}h_{iiq}$ ... $d_{i1n}h_{ni}$, $d_{q1n}h_{niq}$ for the in-phase channel and $d_{q11}h_{iq}$, $d_{i1l}$ $h_{iqi}$ ... $d_{q1n}h_{nq}$, $d_{i1n}h_{nqi}$ for the quadrature channel have not been shown. Their operation should be clear in view of the description of correlators 53*i*, 113*i* and 53*q*, 114*q* and the earlier description of FIG. 1 in which derivation of the single correction signal $Y_i$ was discussed in detail.

Referring now to in-phase correction subsystem 95 (see FIG. 8) for detailed description thereof, this subsystem comprises a signal sample circuit 51*i*, subtract circuits 73*i* and 73*ir*, a digital decision circuit 57*i*, a shift register 52*i*, and correlators 53*i* (only one of which is shown in FIG. 8). Each correlator is identical to the correspondingly numbered block in FIG. 1. These components comprise means for determining the impulse response of the in-phase channel itself. The output of correlator 53*i* (shown in FIG. 8) is coupled to digital multiplier 71*i* to provide the in-phase channel component of the current data bit. This in-phase channel component is coupled to a summing amplifier 72*ir* having another input from a correlator 113*i* and digital multiplier 114*i* to provide the quadrature channel component of the current data bit. The output $d_ih_o$ of summing amplifier 72*ir* is coupled to the subtract circuit 73*ir* to produce the residual signal $R_i$ after subtraction from the corrected signal $S_{ic}$. The residual signal $R_i$ is coupled to both correlators 71*i* and 113*i* to derive the amplitude of the current data bit stored in –0 – cell of shift register 52*i*. As in the embodiment of FIG. 1, each of the correlators 53*i* and 113*i* includes an integrator to integrate the portion of the residual signal $KR_i$ after digital multiplication to provide separate integrated outputs $h_{oi}$ and $h_{oiq}$. The outputs of correlators 53*i* and 113*i* are coupled to digital multipliers 71*i* and 114*i* to provide the proper sign of the integrated outputs $h_{oi}$ and $h_{oiq}$ which are applied to inputs of summing amplifier 72*ir*. Corresponding operations to produce residual signal *Rq* are provided in the quadrature channel by correlators 53*q*, 113*q*, digital mutipliers 71*q*, 114*q*, and summing amplifier 72*qr*.

With regard to the additional sets of correlators 53*i*, 113*i* and digital mutipliers 71*i*, 114*i* for the in-phase channel (not shown), these components provide the inputs for summing amplifier 72*i* shown in FIG. 8 to produce the combined correction signal $Y_{iq}$ compensating for both the in-phase impulse response and the cross-channel impulse response in the in-phase channel. For example, an additional set of correlators 53*i*, 113*i* and digital mutipliers 71*i*, 114*i* (not shown) has inputs coupled to –0 – cells of shift registers 52*i*, 52*q*, respectively, and residual signal *Ri* is coupled to each correlator 53*i*, 113*i*. Further, additional sets (not shown) are provided in the in-phase channel for each set of –2 – ... *n* ... cells of the shift registers 52*i* and 52*q*. The combined correction signal $Y_{iq}$, provided by summing amplifier 72*i*, is subtracted from the sampled received signal $X_{iq}$ from the in-phase product detector 91 and signal sample circuit 51*i* in a subtract circuit 73*i*. Thus, the output of subtract circuit 73*i* is a corrected in-phase channel signal containing those alternate input data bits which were transmitted via in-phase modulator 82 (see FIG. 7). Corresponding operations and components are provided in the quadrature channel, as in the in-phase channel, for compensating for both quadrature impulse response and the cross-channel impulse response of signals in the quadrature channel. Thus, the output of summing amplifier 72*q* of the quadrature channel comprises a combined correction signal $Y_{qi}$ which will compensate for distortion due both to the impulse response of the quadrature transmission channel and also to the cross-channel impulse response resulting from simultaneous transmission of data in the in-phase channel. The correction signal $Y_{qi}$ from summing amplifier 72*q* combined with the received quadrature channel signals (from quadrature product detector 92) by a subtract circuit 73*q*. The output of subtract circuit 73*q* thus contains the corrected quadrature channel received signal, i.e., it contains those alternate input data bits which originally were transmitted via quadrature modulator 83 (see FIG. 7).

Finally, a data combiner 97 is used to combine the corrected received signals from the in-phase and quadrature channels into a single data stream identical to the randomized input data present at the input of data splitter 80 (see FIG. 7). The original data then may be recovered utilizing pseudorandom sequence generator 75' and a modulo-2 adder 76'. Should generator 75' produce a random sequence identical to that generated by a pseudo random sequence generator 77, the output from modulo-2 adder 76' will be identical to that data originally fed to modulo-2 adder 78 in the transmit system of FIG. 7.

It will be appreciated that the present correction system is capable of operation in conjunction with multilevel modulation systems. When so used, it is possible to obtain the impulse response of the transmission channel by correlating the residual signal with the previously received most significant bits only. An appropriate correction signal then may be obtained by first digitally multiplying the impulse response both by the previously received most significant data bits and by the previously received bits of lesser significance and then summing the products. For greater accuracy, the products derived from the bits of most significance may be weighted more heavily in the summation than those products derived from the bits of lesser significance.

Although the invention has been described in detail it is to be understood that the same is by way of illustration and example only, and is not to be taken by way of limitation, the spirit and scope of this invention being limited only by the terms of the appended claims.

I claim:

1. Digital data apparatus comprising:

means for receiving digital data signals;

signal correction means coupled to said receiver means for subtracting a correction signal from signals being received to produce corrected received signals;

digital storage means coupled to said signal correction means for digital storage of data in said corrected received signals; and residual distortion detection means including correlation means coupled to said digital storage means to provide a correlator output corresponding to the current data being received, said residual distortion detection means being responsive to said correlator output and said corrected received signal to provide a signal indicative of residual distortion in said corrected received signal, said correlator means being responsive to said residual signal and prior digital data stored in said storage means to provide said correction signal for said signal correction means.

2. A digital data transmission system comprising:

a transmitter for transmitting digital data signals;

a receiver for said signals including means for storage of said digital data;

a correction circuit means for subtracting s correction signal from said signals being received and for coupling corrected received signals to said storage means;

residual distortion detection means coupled to said correction circuit means for detection of any remaining distortion in said corrected received signals to produce a residual distortion signal; and correlation means having inputs coupled to storage means and to said residual detection means for correlating stored digital data and said residual distortion signal to produce a correction signal corresponding to the distortion in the signals being received, said correlation means having a correlator output coupled to said correction means for applying said correction signal to said correction circuit means to produce said corrected signals.

3. An adaptive system for correcting for distortion of a signal containing digital data and transmitted via a modulation system wherein a portion of said data is transmitted on a first channel and another portion of said data is transmitted on a second channel, said adaptive system comprising in combination:

receiving means for providing a corresponding received signal in each channel;

a first storage register having $n$ cells for storing the most recent $n$ data bits received on said fist channel, $n$ being an integer greater than one;

comparison means provided for each channel for detecting any distortion remaining in the respective received signals after correction for distortion to produce an output residual signal;

means for producing a correction signal comprising;

$n$ first correlators, each associated with a corresponding cell of said first storage register, each of said first correlator comprising multiplier means for digitally mutiplying said output with the datum contained in said corresponding cell of said first shift register, and means for integrating the output signal of said multiplier means;

a second storage register having $m$ cells for storing the most recently received $m$ data bits received on said second channel, $m$ being an integer greater than one;

$m$ second correlators, each associated with a corresponding cell of said second shift register, each of said second correlators comprising;

multiplier means for digitally multiplying said output of said first signal sample means with the datum contained in said corresponding cell of said second shift register, and means for integrating the output signal from said multiplier means;

$m$ first digital multipliers, each associated with a corresponding one of said first correlators and each comprising means for deriving an output having an amplitude equal to said integrated output signal from said corresponding first correlator and having a sign determined by the datum contained in said corresponding cell of said second storage register;

$m$ second digital multipliers, each associated with a corresponding one of said second correlators and each comprising means for deriving an output having an amplitude equal to said integrated output signal for said corresponding second correlator and having a sign determined by the datum contained in said corresponding cell of said second storage register; and means for summing the outputs from each of said first and second digital multipliers to provide said correction signal.

4. The adaptive system defined in claim 3 further comprising means for subtracting said correction signal from said signal received from said first channel to derive a corrected signal.

5. Means for correcting received digital data signals;

subtraction means receiving as one input said received digital data signals;

signal correction means for providing a correction signal to said subtraction means for subtraction from said received signals whereby the difference between said received digital data signals and said correction signal is the desired corrected received signal;

means for storing the most recently corrected received signal in the form of most recently received data bits, including the current received data bit;

means for correlating the most recently stored corrected signal against a residual signal to provide correction signals to said signal correction means;

second subtraction means for subtracting the stored current data bit from said corrected received signal to form a residual signal which residual signal is fed to said means for correlating.

6. The invention according to claim 5 wherein said means for storing is an $n$ cell register for storing the most recently received $n$ data bits including the current data being received wherein $n$ is an integer greater than two; and wherein said means for correlating is comprised of:

$n$ correlators, each associated with a corresponding cell of said storage register, each correlator comprising;

multiplier means for digitally multiplying said residual signal with the datum contained in said corresponding cell, and means for integrating the output signal for said multiplier means.

7. The means for correcting defined in claim 6 wherein $n$ is at least as great as the number of data bits transmitted during the ring out of said impulse response plus an additional correlator for determining the amplitude of the current data bit.

8. The means for correcting defined in claim 6 wherein said multiplier means comprise means for providing an output signal equal in amplitude to said output at predetermined intervals of each of the bit periods and having a sign corresponding to that of said output if the datum in said corresponding cell is true and opposite to that of said output if said datum is false.

9. A system circuit arrangement for correcting for distortion of digital data sent via a signal channel, said circuit arrangement comprising:

a storage register having $n$ cells for storing the most recently received $n$ data bits, including the current data bit, $n$ being an integer greater than one;

signal sample means for periodically sampling the signal received from said transmission channel and for providing an output having an amplitude equal to that of said signal at the preceding sample time;

$n$ correlators, each associated with a corresponding cell of said storage register, each correlator comprising:

multiplier means for digitally multiplying a residual signal with the datum contained in said corresponding cell, and integer means for integrating the output signal from said multiplier means;

$n$ digital multipliers, each associated with a corresponding one of said correlators, each of said multipliers comprising means for deriving an output equal in amplitude to said integrated output signal from said corresponding integrator means and having a sign corresponding to that of said integrated signal output if the datum in the cell corresponding to said correlator is true and opposite to that of said integrated signal output if said datum is false;

means for summing the output of $n-1$ of said digital multipliers to provide a correction signal;

means for subtracting said correction signal from said signal received from said channel to derive a corrected received signal; and second subtraction means for subtracting the correlated output current data bit at the output of said correlated $n$-digital multiplier from the corrected received signal to provide a residual signal which residual signal is fed to said multiplier means.

10. The circuit arrangement defined in claim 9 in which said output of the multiplier for the current data bit it compared with the corrected signal to determined the residual distortion in the corrected signal to produce a residual signal for inputs of said correlators.

11. In conjunction with a multilevel modulation system, the circuit arrangement defined in claim 9 wherein said stored data bits comprise the most significant bits of said digital data.

12. The circuit arrangement as defined in claim 9 further comprising digital decision means for providing a binary output the sense of which is determined by the sign of said corrected received signal.

PO-1050
(5/69)

UNITED STATES PATENT OFFICE
CERTIFICATE OF CORRECTION

Patent No. 3,614,623 Dated October 19, 1971

Inventor(s) Gerald K. McAuliffe

It is certified that error appears in the above-identified patent and that said Letters Patent are hereby corrected as shown below:

Claim 3, column 17, line 41 - Change "for" to --from--.

Claim 9, column 18, line 53 - Delete "current data bit"; Delete "correlated".

Claim 10, column 18, line 57 - After "said" add --correlated--.
line 58 - Change "it" to --is--.

Signed and sealed this 2nd day of May 1972.

(SEAL)
Attest:

EDWARD M.FLETCHER, JR.
Attesting Officer

ROBERT GOTTSCHALK
Commissioner of Patents